(12) United States Patent
Yamada et al.

(10) Patent No.: US 7,866,753 B2
(45) Date of Patent: Jan. 11, 2011

(54) VEHICLE SEAT RECLINING DEVICE

(75) Inventors: Yukifumi Yamada, Toyota (JP);
Hiroyuki Okazaki, Chiryu (JP);
Kazuhide Ishikawa, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/677,327

(22) PCT Filed: Sep. 4, 2008

(86) PCT No.: PCT/JP2008/065952

§ 371 (c)(1),
(2), (4) Date: Mar. 10, 2010

(87) PCT Pub. No.: WO2009/037979

PCT Pub. Date: Mar. 26, 2009

(65) Prior Publication Data

US 2010/0219669 A1 Sep. 2, 2010

(30) Foreign Application Priority Data

Sep. 21, 2007 (JP) .............................. 2007-245220

(51) Int. Cl.
*B60N 2/02* (2006.01)
(52) U.S. Cl. ................ 297/367 L; 297/367 R
(58) Field of Classification Search ............. 297/367 R, 297/367 L, 367 P, 367
See application file for complete search history.

(56) References Cited

U.S. PATENT DOCUMENTS

| | | | |
|---|---|---|---|
| 6,007,153 A * | 12/1999 | Benoit et al. ........... | 297/378.12 |
| 6,454,354 B1 | 9/2002 | Vossmann et al. | |
| 6,626,495 B2 | 9/2003 | Okazaki et al. | |
| 6,715,835 B2 * | 4/2004 | Hoshihara et al. ........... | 297/366 |
| 6,758,525 B2 * | 7/2004 | Uramichi .................... | 297/366 |
| 7,416,255 B2 * | 8/2008 | Yamada et al. .......... | 297/367 R |
| 2002/0043852 A1 | 4/2002 | Uramichi | |
| 2010/0201175 A1 | 8/2010 | Okazaki et al. | |

FOREIGN PATENT DOCUMENTS

| | | |
|---|---|---|
| JP | 2002 119349 | 4/2002 |
| JP | 2002 535106 | 10/2002 |
| JP | 2003 9978 | 1/2003 |

OTHER PUBLICATIONS

U.S. Appl. No. 12/922,778, filed Sep. 15, 2010, Yamada et al.

* cited by examiner

*Primary Examiner*—Joseph Edell
(74) *Attorney, Agent, or Firm*—Oblon, Spivak, McClelland, Maier & Neustadt, L.L.P.

(57) ABSTRACT

In a vehicle seat reclining device, within a predetermined angle range, the movement of every pawl in a direction towards engagement with an internal toothed portion is surely restricted to avoid any undesired contact between the pawls and the internal toothed portion. A transmitting structure for transmitting and converting the rotational action of the cam to the movement actions of the main pawl and the sub pawl as provided. Further provided are first and second restricting structures holding the main pawl under disengagement state between the external toothed portion and the internal toothed portion within the predetermined angle range. Within a predetermined frontward tilting angle range, the sub pawl is retained to be in disengagement state between the external toothed portion of the sub pawl and the internal toothed portion by the transmitting structure and the second restricting structure.

12 Claims, 5 Drawing Sheets

VEHICLE SEAT RECLINING DEVICE

TECHNICAL FIELD

This invention relates to a vehicle seat reclining device.

BACKGROUND OF THE TECHNOLOGY

Conventionally, a vehicle seat reclining device disclosed in the patent document 1 is known. As shown in FIGS. 1, 3 through 6 of the patent document 1, the vehicle seat reclining device includes a first arm (lower arm 1) fixed to one of a seat cushion side and a seat back, a second arm (upper arm 2) relatively rotatably supported by the first arm and supported by the other of the seat cushion and the seat back, a plurality of pawls (pawl 50, 60) provided at the first arm and a portion to be engaged (internal toothed portion 25a) provided at the second arm and engaged with the plurality of pawls. According to this vehicle seat reclining device, the plurality of pawls include a first pawl 50 (one is provided) and a second pawl 60 (two pawls are provided) and a contacting portion (projection 51) is provided only at the first pawl 50 and a portion to be contacted (projection 27) is provided at the second arm for preventing the engagement action between the pawl and the portion to be engaged by the engagement between the contacting portion (51) and the portion to be contacted.

According to thus structured vehicle seat reclining device, when the operating handle 85 is released after rotating the seat back within a so-called frontward tilting angle relative to the seat cushion under the lock being released, the cam 40 pushes the pawl 50 in a direction of engagement with the internal toothed portion 25a by the biasing force of spring 86. However, the movement of the pawl 50 is restricted and no engagement with the internal toothed portion. The other two pawls are positioned where the engagement with the internal toothed portion cannot be attained by the function of an elongated cam hole 66 and a projection pin 47. Thus, the seat back can be rotated without being locked within the frontward tilting angle range.

Patent Document 1: JA 2003-9978 A

DISCLOSURE OF INVENTION

Problems to be Solved

However, according to the above conventional vehicle seat reclining device disclosed in the patent document 1, within the frontward tilting angle range, the first pawl 50 is pushed towards the direction to be engaged with the internal toothed portion 25a by cam function caused by the urging force of spring 86 but the projection 51 and the projection 27 are engaged with each other to position the first pawl 50 stationarily. On the other hand, the other second pawl 60 is retained at the position where the engagement with the internal toothed portion 25a cannot be attained. However, since a clearance between the elongated cam hole 66 and the projection pin 47 and another clearance between the second pawl 60 and a guide wall 121 guiding the pawl 60 are provided, the second pawl 60 is freely movable within the range of those clearances (generating rattling noise). Thus, the external toothed portion 64 of the freely moving second pawl 60 may generate assembling errors or may be worn out due to aged deterioration and eventually may be brought in contact with the internal toothed portion 25a of the second arm.

The present invention was made in consideration with the above problems and the object of the invention is to provide a vehicle seat reclining device in which, within a predetermined angle range, the movement of every pawl towards the direction to be engaged with the internal toothed portion is restricted reliably and assuredly so that any undesirable contact of every pawl with the internal toothed portion can be completely avoided.

Means for Solving the Problem

The vehicle seat reclining device of this invention in a first aspect made for solving the above problem features that the vehicle seat reclining device comprises a first arm adapted to be fixed to one of a seat cushion side and a seat back side of a vehicle seat, a second arm adapted to be fixed to the other of the seat cushion side and the seat back side of the vehicle seat and relatively rotatably supported by the first arm, an internal toothed portion provided in an inner space formed between the first arm and the second arm, the internal toothed portion being formed at the second arm, a plurality of pawls including a main pawl and a sub pawl provided in the inner space and movably supported by the first arm, each of the plurality of pawls having an external toothed portion engaging with or disengaging from the internal toothed portion in response to the movement of the each pawl, a cam rotatably provided in the inner space for pushing the each pawl to engage the external toothed portion of the each pawl with the internal toothed portion and moving the each pawl to disengage the external toothed portion from the internal toothed portion, a spring provided between the first arm and the cam for rotatably urging the cam in a direction in which the each pawl is pushed by the cam, a transmitting structure provided between the plurality of pawls and the cam for transmitting and converting the rotational action of the cam to the movement action of the pawls, a first restricting structure disposed between at least one of the main pawls among the plurality of pawls and the second arm for holding the main pawl under the disengagement condition between the external toothed portion of the main pawl and the internal toothed portion and a second restricting structure disposed between the sub pawl which is not a part of the first restricting structure and the cam for holding the sub pawl under the disengagement condition between the external toothed portion of the sub pawl and the internal toothed portion.

The vehicle seat reclining device of this invention in a second aspect features that, in the first aspect, one end of the spring is engaged with the first arm and the other end thereof is engaged with the cam so that the cam is pushed away from the sub pawl by the force of spring when the spring extends.

The vehicle seat reclining device of this invention in a third aspect features that, in the first aspect, the transmitting structure is formed by the first projection formed on the cam and the first cam groove formed on the plurality of pawls and engaged with the first projection inserted into the first cam groove.

The vehicle seat reclining device of this invention in a forth aspect features that, in the first aspect, the first restricting structure is formed by the second projection formed on the main pawl and the stepped portion formed on the second arm and engaged with the second projection and wherein the movement of the main pawl in an engagement direction is restricted by the engagement between the second projection and the stepped portion.

The vehicle seat reclining device of this invention in a fifth aspect features that, in the forth aspect, the number of main pawl is two or more.

The vehicle seat reclining device of this invention in a sixth aspect features that, in the first aspect, the second restriction structure is formed by a third projection formed on the cam and a second cam groove formed on the sub pawl and engaged with the third projection inserted into the second cam groove, and wherein the movement of the sub pawl in the engagement direction is restricted by the engagement between the third projection and the second cam groove.

The vehicle seat reclining device of this invention in a seventh aspect features that, in the sixth aspect, the second restricting structure has a function of the transmitting structure as well.

THE EFFECTS OF THE INVENTION

According to the invention in the first aspect, associated with the structure above, a transmitting structure for transmitting and converting the rotational action of the cam to the movement action of the pawls including at least one main pawl and the sub pawl is provided between the pawls and a cam. A first restricting structure for holding the main pawl under the disengagement state between the external toothed portion of the main pawl and the internal toothed portion is provided between the main pawl and a second arm. According to the structure, within the frontward tilting angle range for the vehicle seat reclining device the main pawl is pushed in the engagement direction with the internal toothed portion by the cam action generated by the force of spring but held to the state of disengagement between the external toothed portion of the main pawl and the internal toothed portion by the first restricting structure. On the other hand, a second restricting structure for holding the sub pawl under the disengagement state between the external toothed portion and the internal toothed portion is disposed between the sub pawl and the cam. The sub pawl is not a part of the first restricting structure. According to the structure, within the frontward tilting angle range for the vehicle seat reclining device, the sub pawl is held to the state of disengagement between the external toothed portion of the sub pawl and the internal toothed portion by the transmitting structure and the second restricting structure. Accordingly, in the vehicle seat reclining device, within the predetermined angle range (frontward tilting angle range) all pawls are reliably restrained from moving towards the engagement with the internal toothed portion and positioned stationarily, thereby avoiding unnecessary contact between all the pawls and the internal toothed portion.

According to the vehicle seat reclining device according to the invention in the second aspect, associated with the structure above, one end of the spring is engaged with the first arm and the other end is engaged with the cam so that the cam is pushed away from the sub pawl by the force of spring when the spring extends. Accordingly, within the frontward tilting angle range for the vehicle seat reclining device, the sub pawl movable with the cam can be moved away from the internal toothed portion by the force of the spring within a clearance provided in the cam, for instance, to avoid undesired contact between the sub pawl and the internal toothed portion.

According to the vehicle seat reclining device according to the invention in the third aspect, associated with the structure above, since the transmitting structure is formed by the first projection formed on the cam and the first cam groove formed on the plurality of pawls and engaged with the first projection inserted into the first cam groove, the rotation action of the cam can be surely transmitted to and converted into the movement action of the pawl with a simple construction.

According to the vehicle seat reclining device according to the invention in the forth aspect, associated with the structure above, since the first restricting structure is formed by the second projection formed on the main pawl and the stepped portion formed on the second arm and engaged with the second projection and the movement of the main pawl in an engagement direction is restricted by the engagement between the second projection and the stepped portion, the movement of the main pawl towards the engagement direction can be reliably restricted to surely position or lock the main pawl.

According to the vehicle seat reclining device according to the invention in the fifth aspect, associated with the structure above, since the number of main pawl is set to be two (2) or more, the impact of the main pawl on the second arm upon engagement can be reduced to minimize the damages of the parts and expand the lifespan of the parts. Further, the probability of contact between the sub pawl 26 and the internal toothed portion can be reduced by reducing the number of sub pawl.

According to the vehicle seat reclining device according to the invention in the sixth aspect, associated with the structure above, since the second restriction structure is formed by a third projection formed on the cam and a second cam groove formed on the sub pawl and engaged with the third projection inserted into the second cam groove, and the movement of the sub pawl in the engagement direction is restricted by the engagement between the third projection and the second cam groove, the movement of the sub pawl towards the engagement direction can be reliably restricted to surely position or lock the sub pawl.

According to vehicle seat reclining device according to the invention in the seventh aspect, associated with the structure above, since the second restricting structure has a function of the transmitting structure, the rotation action of the cam can be surely transmitted to and converted into the movement action of the sub pawl with a simple construction.

BRIEF EXPLANATION OF ATTACHED DRAWINGS

Figure 3:
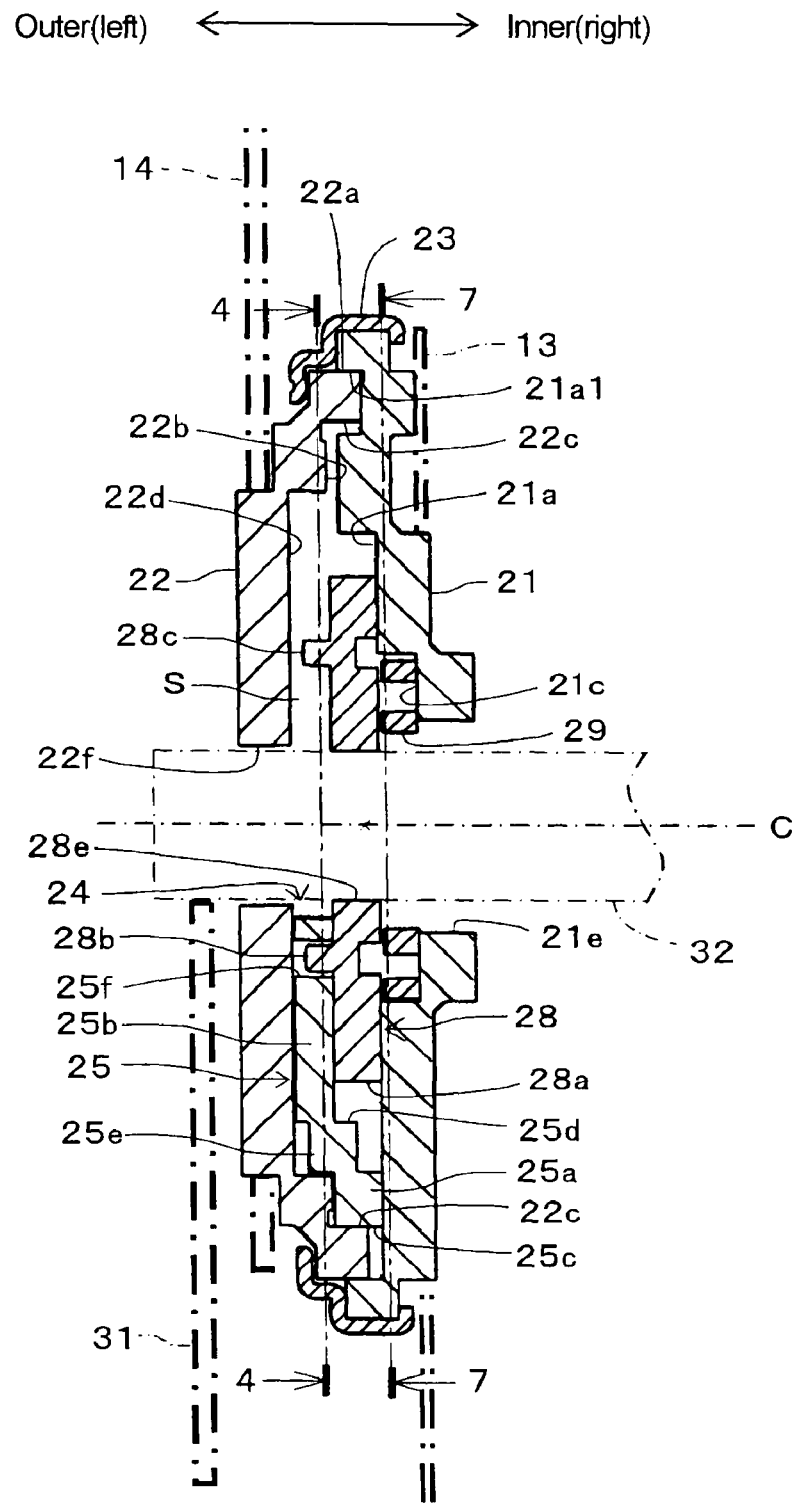
FIG. 3 is a cross sectional end view taken along the line 3-3 of FIG. 2.
Figure 6:
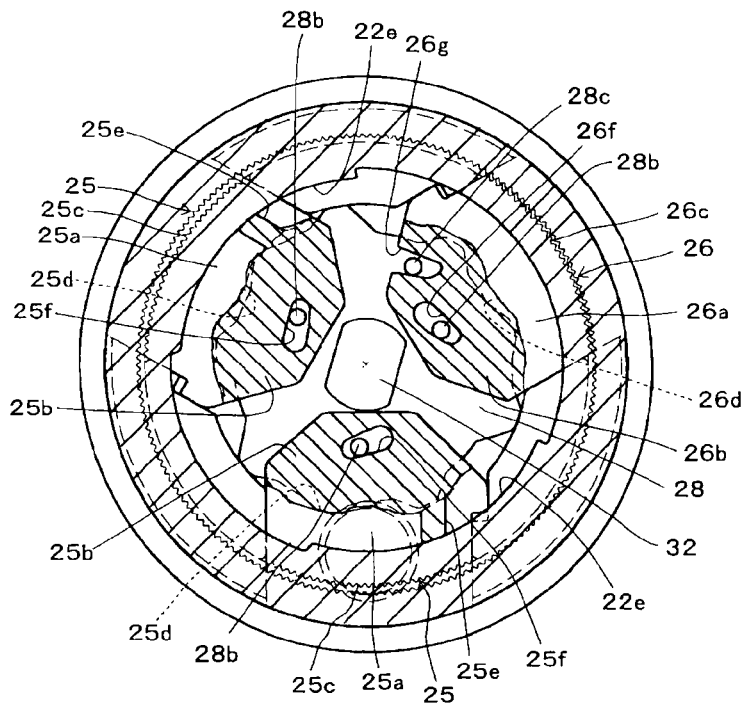

FIG. 6 is a cross sectional view taken along the line 4-4 of FIG. 3, showing the projection 25e being engaged with the stepped portion 22e within the frontward tilting angle range for the vehicle seat reclining device.

Figure 7:
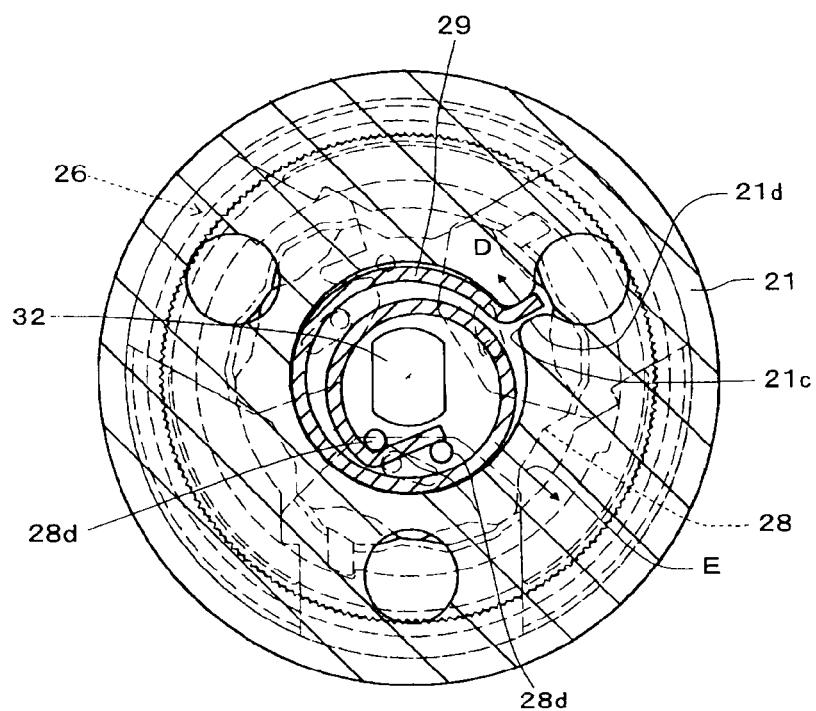

FIG. 7 is a cross sectional view taken along the line 7-7 of FIG. 3 and showing the locked condition of the vehicle seat reclining device.

EXPLANATION OF REFERENCE NUMERALS

10; vehicle seat, 11; seat cushion, 12; seat back, 13; seat cushion frame, 14; seat back frame, 20; vehicle seat reclining device, 21; lower arm (first arm), 21a; recess, 21d; engaging portion, 22; upper arm (second arm), 22b; recess, 22c; internal toothed portion, 22e; stepped portion, 23; ring member, 24; lock mechanism, 25; main pawl, 26; sub pawl, 25a, 26a; first surface portion 25b, 26b; second surface portion, 25c, 26c; external toothed portion, 25e; projection (second projection), 25f, 26f; cam elongated hole (first cam groove), 26g; cam recessed portion (second cam groove), 28; cam, 28b; cam projection (first projection), 28c; cam projection (third projection), 29; spring, 30; pawl control member, 31; operating lever, 32; rotation axis, C; rotation axial line, S; inner space.

THE BEST MODE EMBODIMENTS OF THE INVENTION

Figure 1:
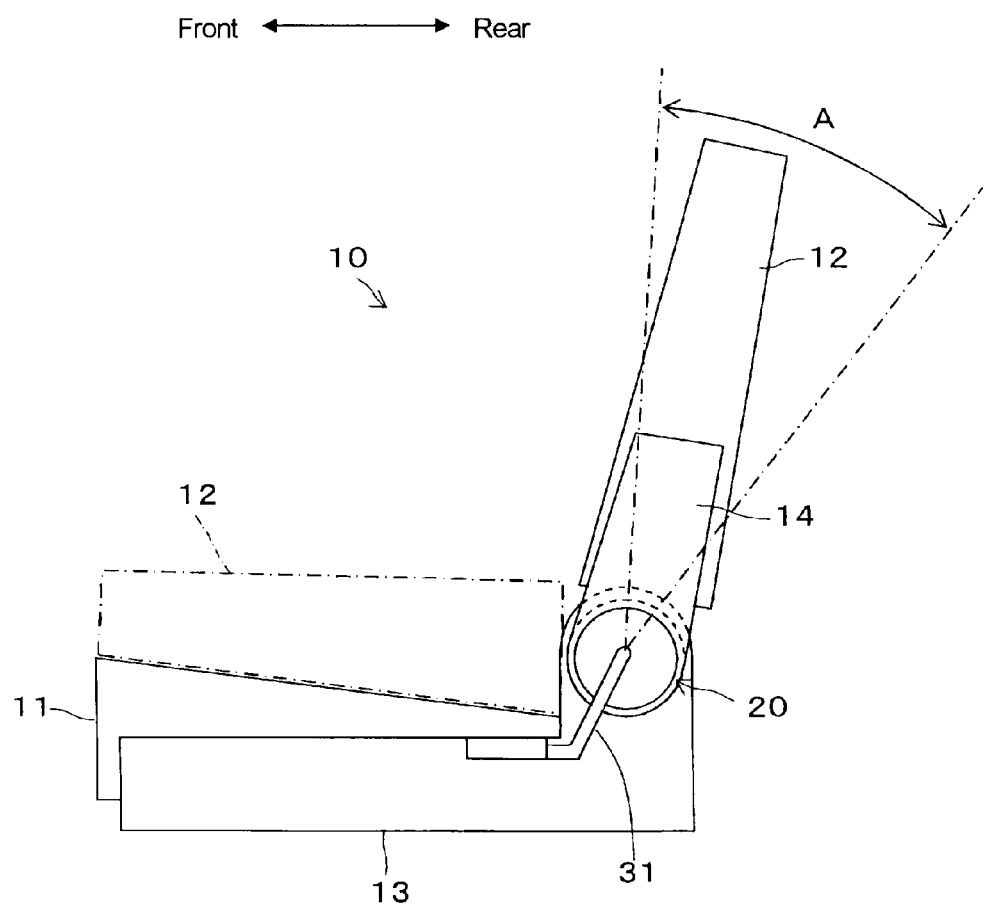
FIG. 1 is a side view of a schematically illustrated vehicle seat to which the vehicle seat reclining device according to the invention is applied.
Figure 2:
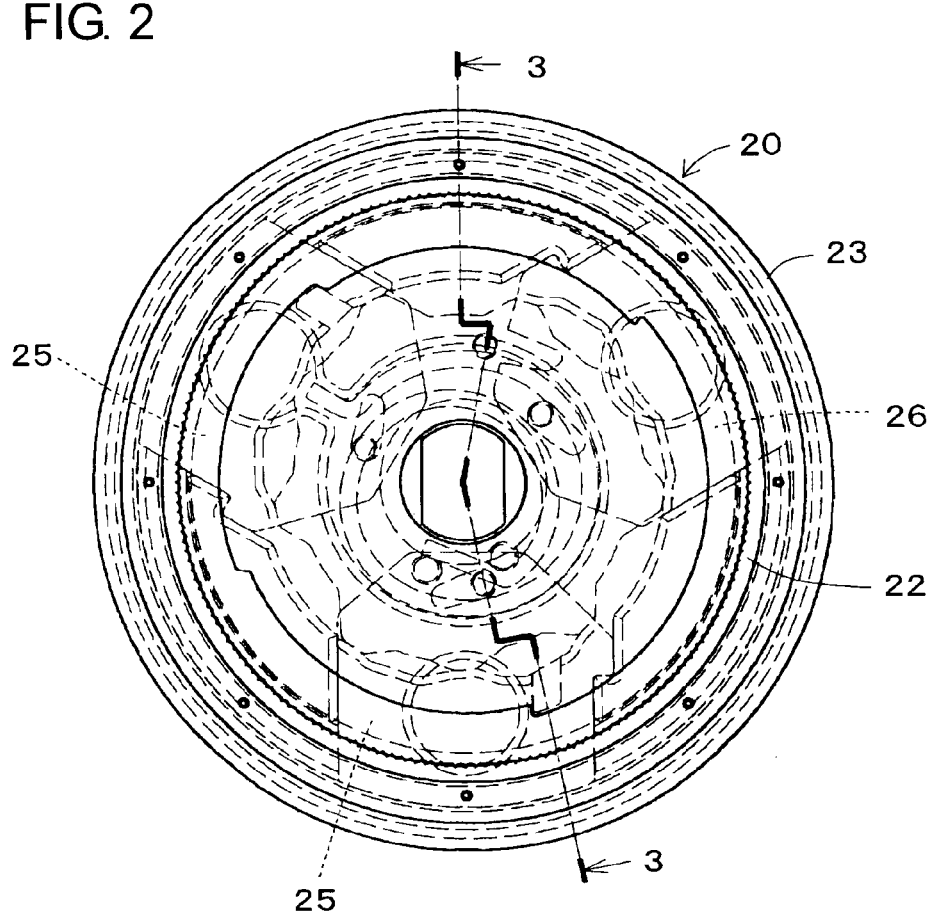
FIG. 2 is an enlarged view of the vehicle seat reclining device shown in FIG. 1.

One of the embodiments of the vehicle seat to which the vehicle seat reclining device according to the invention is applied will be explained with reference to the attached drawings. FIG. 1 is a side view of a vehicle seat schematically illustrated. FIG. 2 is an enlarged view of the vehicle seat reclining device and FIG. 3 is a cross sectional end view taken along the line 3-3 of FIG. 2.

As shown in FIG. 1, the vehicle seat 10 includes a seat cushion 11 to be fixed to a vehicle floor (not shown), a seat back 12 rotatably supported by a rear side of the seat cushion 11 and a vehicle seat reclining device 20 (hereinafter simply called as reclining device) for adjusting a reclining position of the seat back 12 relative to the seat cushion 11 according to a desired position of an occupant of the seat and locking the seat back 12 to a selected position. The position of the seat back 12 is adjusted and locked to a desired reclined angle within a predetermined range A and further the seat back 12 can be tilted forward until the seat back 12 overlaps on the seat cushion 11 (the state showing with a dashed line in FIG. 1).

The reclining device 20 includes a disc shaped lower arm (first arm) 21 and a disc shaped upper arm (second arm) 22 as shown in FIGS. 2 and 3. The lower arm 21 is adapted to be fixed to the seat cushion 11 side. In other words, the lower arm 21 is fixed by welding or the like to a seat cushion frame 13 to which the seat cushion 11 is fixed. The upper arm 22 is relatively rotatably supported by the lower arm 21. The upper arm 22 is adapted to be fixed to the seat back 12 side. In other words, the upper arm 22 is fixed by welding or the like to a seat back frame 14 to which the seat back 12 is fixed.

The lower arm 21 includes a recess portion 21a opening towards the upper arm 22 side as shown in FIG. 3. The recess portion 21a is formed by half die cutting process or a half blanking process and includes an inner peripheral surface 21a1 having a rotation axis line C which is common to the rotation axis line of the upper and lower arms 22 and 21. The upper arm 22 is fitted into the lower arm 21 and an outer peripheral surface 22a of the upper arm 22 is slidably engaged with the inner peripheral surface 21a of the lower arm 21 to function as a shaft and bearing surface in a relative rotation therebetween. On the other hand, the upper arm 22 includes a recess 22b open to the lower arm 21 side. The recess 22b is formed by half die cutting process and is provided with an internal toothed portion 22c around the entire inner peripheral surface of the recess 22b centering on the rotation axis C. The internal toothed portion 22c is provided in an inner space S formed between the lower arm 21 and the upper arm 22.

As shown in FIG. 3, a ring member 23 is staked to the lower arm 21 for covering the outer peripheral portion of the lower arm 21 and one side surface of the ring member 23 embraces the outer peripheral portion of the upper arm 22 and rotatably supports thereof. Thus, the lower arm 21 and the upper arm 22 are supported under a condition that both arms are mutually rotatably assembled.

As shown mainly in FIG. 3, a lock mechanism 24 is provided in the inner space S formed between the lower arm 21 and the upper arm 22 for locking the seat back 12 to an adjusted reclined position. The lock mechanism 24 mainly includes a main pawl 25 provided with an external toothed portion (engaging toothed portion) 25c engaging with or disengaging from (releasable from the engaging state) the internal toothed portion 22c formed at the upper arm 22, a sub pawl 26 provided with an external toothed portion (engaging toothed portion) 26c engaging with or disengaging from (releasable from the engaging state) the internal toothed portion 22c formed at the upper arm 22, a cam 28 rotatable with a rotation shaft 32 rotated by an operating lever 31 and engaging the main pawl 25 and sub pawl 26 with the internal toothed portion 22c or disengaging the main and sub pawls 25 and 26 from the internal toothed portion 22c through the rotation thereof and a spring 29 rotatably urging or biasing the cam 28 in a direction to push the main and sub pawls 25 and 26.

A plurality of pawls formed by the main pawl 25 and the sub pawl 26 are arranged in a plane intersecting with the rotation axis line C with a right angle and the plurality of pawls (in the embodiment, three pawls) are arranged with an equal angle with one another. The number of main pawl 25 is two (2) and the number of sub pawl 26 is one (1). As to the number of main pawl 25, at least one is needed, but one is enough. The main and sub pawls 25 and 26 are movable (reciprocal) in a radial direction within a guide recess 21b formed at the recess 21a of the lower arm 21 and extending in a radial direction. The internal toothed portion 22c and the external toothed portions 25c and 26c are engaged with or disengaged from each other by the respective movements of the main and sub pawls 25 and 26.

Figure 4:
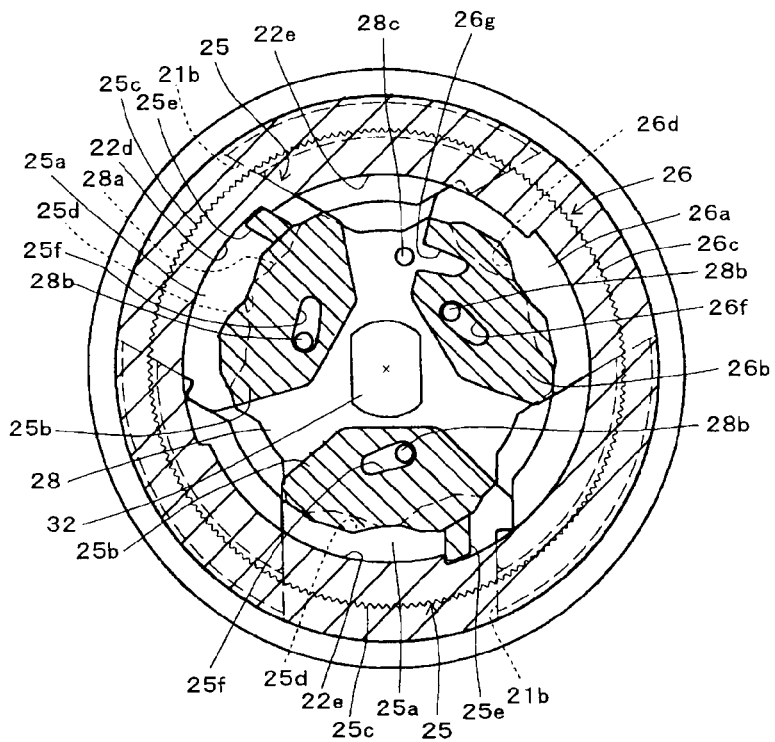
FIG. 4 is a cross sectional view taken along the line 4-4 of FIG. 3 and showing the locked condition of the vehicle seat reclining device.
Figure 5:
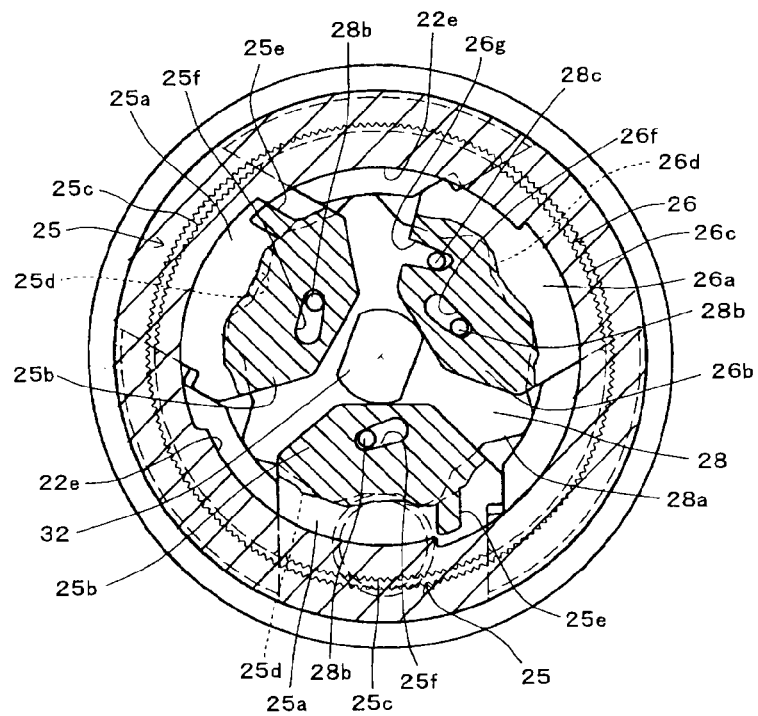
FIG. 5 is a cross sectional view taken along the line 4-4 of FIG. 3 and showing the unlocked condition of the vehicle seat reclining device.

As shown mainly in FIGS. 4 through 6, the main pawl 25 is made from a plate shaped steel material and includes a first surface portion 25a and a second surface portion 25b consecutively connected to the first surface mutually having a step therebetween. As a whole, the main pawl 25 is approximately of base plate shaped hexagonal shape. A top end side of the first surface portion 25a of the main pawl 25 is formed with an external toothed portion 25c for engagement with the internal toothed portion 22c and at the end side opposite to the toothed portion 25c side, a back cam surface 25d is provided on the stepped portion between the first and second surface portions 25a and 25b. The back cam surface 25d is engaged with the cam surface 28a formed at the outer peripheral portion of the cam 28 to be pushed outwardly.

A projection (second projection) 25e is formed at the first surface portion 25a projecting in the same direction with the protrusion of the second surface portion 25b. The projection 25e is adapted to be engaged with a stepped portion 22e partially formed on the inner peripheral portion of a recessed portion 22d having a central rotation axis line C. The recessed portion 22d is formed in the recessed portion 22b of the upper arm 22. The stepped portion 22e is designed to have a range corresponding to the range from the front-most portion of the range A for the seat back reclining adjustment to the position where the seat back overlaps with the seat cushion, in other words, to have the frontward tilting angle range. Further, the inner peripheral portion of the recessed portion 22d other than the stepped portion 22e is designed to have the ranges corresponding to the range A and the state overlapping of the seat back on the seat cushion.

Further, a cam elongated hole (first cam groove) 25f is formed at the second surface portion 25b and penetrates therethrough in a thickness direction. A cam projection 28b (first projection) formed on the cam 28 passes through this cam elongated hole 25f. The both sides of the main pawl 25 sandwiching the external toothed portion 25c have a pair of straight lines in parallel with each other. These straight line portions are guided having a clearance with the guide recess portion 21b.

The sub pawl 26 is structured basically same as the main pawl 25 as shown mainly in FIGS. 4 through 6, the sub pawl 26 includes a first surface portion 26a, a second surface portion 26b, an external toothed portion 26c, a back cam surface 26d and a cam elongated hole (first cam groove) 26f. A cam recess (second cam groove) 26g is provided at the second surface portion 26b of the sub pawl 26 and penetrates therethrough in a thickness direction. The cam projection 28c (third projection) formed on the cam 28 advances in or retracts from the cam recess 26g.

The cam 28 is arranged in the inner space S and rotatable on the rotation axis line C. The cam 28 pushes the main and sub pawls 25 and 26 to bring into engagement between the external toothed portions 25c and 26c and the internal toothed portion 22c of the upper arm 22 and at the same moves the main and sub pawls 25 and 26 to disengage the engagement between the external toothed portions 25c and 26c and the internal toothed portion 22c of the upper arm 22. A cam surface 28a is formed on the outer peripheral wall surface of the cam 28. The main and sub pawls 25 and 26 are arranged movably in a reciprocal direction on the outer peripheral portion of the cam 28 in a radial direction to have the same plane with the cam 28. The cam 28 is provided with the cam projection 28b (first projection) to be inserted into the can elongated holes 25f and 26f of the main and sub pawls 25 and 26 and at the same time provided with the cam projection 28c (third projection) to be inserted into or retracted from the cam recess 26g of the sub pawl 26. The cam projection 28c is formed at a position predetermined distance separated from the cam projection 28b. The predetermined distance is defined as a proportion to the width of the sub pawl 26. This proportion is set to have a sufficient support of the cam 28 in a rotational direction. The position of the cam projection 28c is farther than the position of the cam projection 28b with respect to the rotation axis line C. Thus, when the cam projection 28c engaged within the cam recess 26g, the positioning can be carried out with a stronger force.

The spring 29 is provided in the inner space S between the lower arm 21 and the cam 28. In other words, the spring 29 is accommodated in the accommodating recess 21c formed at the accommodating recess 21a of the lower arm 21. The spring is a spiral type spring rotationally biasing the cam 28 in a direction to push the main and sub pawls 25 and 26.

One end (free end) of the spring 29 is engaged with the engaging portion 28d of the cam 28 and the other end (fixed side end) of the spring 29 is engaged with an engaging portion 21d of the lower arm 21. The spring is arranged so that the cam 28 is pushed away from the sub pawl 26 by the force of spring when extending. The cam 28 and the lower arm 21 are inserted into the rotation shaft 32 with a certain clearance and accordingly, the cam 28 and the lower arm 21 are relatively movable in a radial direction. Thus, when the projection 25e of the main pawl 25 is running on the stepped portion 22e of the upper arm 22 and the spring 29 is going to extend from the compressed condition, the spring 29 pushes the lower arm 21 in an arrow D direction at the engaging portion 21d of the lower arm 21 as shown in FIG. 7 and at the same time the reaction force is applied to the spring 29 in an arrow E direction. Accordingly, the cam 28 is moved in the arrow E direction thereby to move the sub pawl 26 in the same arrow E direction.

One end of the operating lever 31 is rotatably connected to the outer end of the rotation shaft 32 and the other end is manually operated by an occupant of the seat. The rotation shaft 32 is arranged on the rotation axis line C and is inserted into the through holes 21e, 28e and 22f of the lower arm 21, cam 28, and upper arm 22, respectively. The rotation shaft 32 is rotatably supported by the lower arm 21 and the upper arm 22. The through hole 28e of the cam 28 is inserted into the rotation shaft 32 for unitary rotation of the cam 28 and the rotation shaft 32.

A transmitting structure is formed by the cam projection (first projection) 28b of the cam 28 and the cam elongated holes (first cam groove) 25f and 26f of the main and sub pawls 25 and 26. The transmitting structure is disposed between the main and sub pawls 25 and 26 and the cam 28 and transmits and converts the rotation operation of the cam 28 to the movement operation of the main and sub pawls 25 and 26.

The first restricting structure is formed by the projection (second projection) 25e of the main pawl 25 and the stepped portion 22e of the upper arm 22. The first restricting structure is disposed between at least one main pawl 25 among the plurality of pawls and the upper arm 22 and holds the main pawl 25 to be under the engagement released condition between the external toothed portion 25c and the internal toothed portion 22c. In other words, when the projection 25e is engaged with the stepped portion 22e (when the projection runs on the stepped portion 22e as shown in FIG. 6), the main pawl 25 cannot be moved further outward and the external toothed portion 25c cannot be engaged with the internal toothed portion 22c.

The second restricting structure is formed by the cam projection (third projection) 28c of the cam 28 and the cam recess (second cam groove) 26g of the sub pawl 26 into which the cam projection 28c is inserted. The second restriction structure is disposed between a sub pawl 26 among the plurality of pawls The sub pawl 26 is not used as the part of the first restricting structure. The second restricting structure holds the sub pawl 26 to be under the engagement released condition between the external toothed portion 26c and the internal toothed portion 22c. In other words, when the cam projection 28c is engaged with the cam recess 26g (FIG. 6), the sub pawl 26 cannot be moved further outward and the external toothed portion 26c cannot be engaged with the internal toothed portion 22c.

Next, the operation of the vehicle seat reclining device as constructed above will be explained. When the operating lever 31 is not operated by the occupant of the seat (in case the lever 31 being not held upward in FIG. 1), the cam 28 is biased or urged in a counterclockwise direction as viewed in FIG. 4 by the force of the spring 29 and when the cam 28 is rotated in a counterclockwise direction, the back cam surface 25d engages with the cam surface 28a and the cam projection (first projection) 28b engages with the cam elongated holes (first cam groove) 25f and 26f. Then the main and sub pawls 25 and 26 are moved towards the internal toothed portion 22c to bring the engagement between the external toothed portion 25c and 26c and the internal toothed portion 22c to engage the main and sub pawls 25 and 26 with the upper arm 22. Accordingly, the seat back 12 can be reclined and locked to a desired reclined position.

On the other hand, when the operating lever 31 is manually operated by the occupant of the seat (in case the lever 31 being held upward in FIG. 1), the cam 28 is rotated in a clockwise direction overcoming the force of the spring 29 which urges the cam 28 in a counterclockwise direction as viewed in FIG. 5. When the cam 28 is rotated in a clockwise direction, the back cam surface 25d disengages with the cam surface 28a and the cam projection (first projection) 28b engages with the cam elongated holes (first cam groove) 25f and 26f. Then the main and sub pawls 25 and 26 are moved away from the internal toothed portion 22c to release the engagement between the external toothed portion 25c and 26c and the internal toothed portion 22c to disengage the main and sub pawls 25 and 26 from the upper arm 22.

During the operating lever 31 being operated, the engagement between the main and sub pawls 25 and 26 and the upper arm 22 is released and therefore, the tilting of the seat back 12 can be carried out. The range of this tilting is from the rear end position in the range A to the condition of overlapping on the seat cushion 11 as shown in FIG. 1.

Within the predetermined range A, the seat back 12 can be adjusted to any desired angle position and once the position is decided, the operating lever 31 is released to again engage the main and sub pawls 25 and 26 with the upper arm 22 to lock the position of the seat back 12.

Within the frontward tilting angle range, even if the operation of the operating lever 31 is released, the spring 29 urges in a counterclockwise direction and the projection 25e is pushed towards the stepped portion 22e to establish the engagement therebetween (when the projection runs on the stepped portion 22e as shown in FIG. 6), the main pawl 25 is restricted from the movement towards the internal toothed portion 22c and locked to the position. As to the sub pawl 26, not only the engagement between the cam projection 28b and the cam elongated hole 26f, but also the engagement between the cam projection 28c and the cam recess 26g are achieved to hold the one side end of the sub pawl 26 opposite to the external toothed portion side at two portions of both sides. Thus the movement of the sub pawl 26 towards the internal toothed portion 22c is restricted and locked to the position without swinging movement. Accordingly, the engagement of both main and sub pawls 25 and 26 with the upper arm 22 are restricted. Thus, the seat back 12 can be tilted without operating the operating lever 31.

Under the overlapped position of the seat back 12 on the seat cushion 11 (the condition indicated with a chain line in FIG. 1), by releasing the operating lever 31, main and sub pawls 25 and 26 are engaged with the upper arm 22 to lock the seat back 12 to the overlapped position.

As apparent from the explanation above, in the embodiment of the invention, the transmitting structure for transmitting and converting the rotational movement of the cam 28 to the movements of the plurality of pawls including the at least one main pawl 25 and the sub pawl 26 is disposed between the pawls and the cam 28. The first restricting structure for holding the main pawl 25 under the disengagement state between the external toothed portion 25c and the internal toothed portion 22c is disposed between the main pawl 25 and the upper arm 22. According to the structure, within the frontward tilting angle range for the vehicle seat reclining device the pawl 25 is pushed in the engagement direction with the internal toothed portion by the cam action generated by the force of spring 29 but held to the state of disengagement between the external toothed portion 25c of the main pawl 25 and the internal toothed portion 22c by the first restricting structure. On the other hand, the second restricting structure for holding the sub pawl 26 under the disengagement state between the external toothed portion 26c and the internal toothed portion 22c is disposed between the sub pawl 26 among the plurality of pawls, which is not used as a part of the first restricting structure, and the cam 28. According to the structure, within a predetermined angle range (the frontward tilting angle range) for the vehicle seat reclining device, the sub pawl 26 is held to the state of disengagement between the external toothed portion 26c of the sub pawl 26 and the internal toothed portion 22c by the transmitting structure and the second restricting structure. Accordingly, in the vehicle seat reclining device, the predetermined angle range (frontward tilting angle range) all pawls 25 and 26 are reliably restricted the movement towards the engagement with the internal toothed portion 22c and positioned stationarily, thereby avoiding unnecessary contact between all the pawls 25 and 26 and the internal toothed portion 22c.

The spring 29 is engaged with the lower arm 21 at one end and at the other end with the cam 28 so that the cam 21 is pushed away from the position of sub pawl 26 by the force of spring 29 when the spring 29 is going to extend. Thus, within the frontward tilting angle range of the vehicle seat reclining device, the sub pawl 26 which moves in association with the cam 28 can be moved away from the internal toothed portion 22c by the force of spring 29 within the clearance in the cam 28, for instance, thereby surely avoiding the undesired contact between the sub pawl 26 and the internal toothed portion 22c.

Further, since the transmitting structure is formed by the first projection 28b formed on the cam 28 and the first cam groove 25f and 26f formed on the pawl and engaged with the first projection 28b inserted into the first cam groove 25f and 26f, the rotation movement of the cam 28 can be surely transmitted to and converted into the movement of the pawls 25 and 26 with a simple structure.

The first restricting structure is formed by the second projection 25e formed on the main pawl 25 and the stepped portion 22e formed on the upper arm 22 and engaged with the second projection 25e and the movement of the main pawl 25 in an engagement direction is restricted by the engagement between the second projection 25e and the stepped portion 22e. Thus the movement of the main pawl 25 in the engagement direction can be surely restricted to reliably achieve the positioning with the simple structure.

Further, the second restriction structure is formed by the third projection 28c formed on the cam 28 and the second cam groove 26g formed on the sub pawl 26 and engaged with the third projection 28c inserted into the second cam groove 26g and the movement of the sub pawl 26 in the engagement direction is restricted by the engagement between the third projection 28c and the cam groove 26g. Thus the movement of the sub pawl 26 in the engagement direction can be surely restricted to reliably achieve the positioning with the simple structure.

It is preferable to add the function of the transmitting structure to the second restricting structure. Thus, the rotation movement of the cam 28 is surely with the simple construction transmitted to and converted into the movement operation of the sub pawl.

It is preferable to provide a plurality of main pawls 25. Thus, the impact generated upon engagement between the main pawl 25 and the stepped portion 22e of the upper arm can be reduced thereby reducing the damages of the parts and expanding the lifespan of the device. Further, by increasing the number of main pawl 25, the number of sub pawl 26 can be decreased to reduce the probability of contact between the sub pawl 26 and the internal toothed portion 22c.

As stated above in the embodiment, the lower arm 21 as the first arm is fixed to the seat cushion 11 side and the upper arm 22 as the second arm is fixed to the seat back 12 side. However, in opposite, the lower arm 21 may be fixed to the seat back 12 side and the upper arm 22 may be fixed to the seat cushion side.

INDUSTRIAL APPLICABILITY

In the vehicle seat reclining device according to the invention, within a predetermined angle range, all pawls are surely restricted from the movement towards the engagement with the internal toothed portion to surely avoid unnecessary contact between the every pawl with the internal toothed portion.

The invention claimed is:

1. A vehicle seat reclining device comprising:
   a first arm adapted to be fixed to one of a seat cushion side and a seat back side of a vehicle seat;
   a second arm adapted to be fixed to the other of the seat cushion side and the seat back side of the vehicle seat and relatively rotatably supported by the first arm;
   an internal toothed portion provided in an inner space formed between the first arm and the second arm, the internal toothed portion being formed at the second arm;
   a plurality of pawls including at least one main pawl and a sub pawl provided in the inner space and movably supported by the first arm, each of the plurality of pawls having an external toothed portion engaging with or disengaging from the internal toothed portion in response to the movement of the respective pawl;
   a cam rotatably provided in the inner space for pushing the respective pawl to engage the external toothed portion of the respective pawl with the internal toothed portion and moving the respective pawl to disengage the external toothed portion from the internal toothed portion;
   a spring provided between the first arm and the cam for rotatably urging the cam in a direction in which the respective pawl is pushed by the cam;
   a transmitting structure provided between the plurality of pawls and the cam for transmitting and converting the rotation of the cam to the movement of the pawls;
   a first restricting structure disposed between the at least one main pawl and the second arm for holding the at least one main pawl in a disengagement state between the external toothed portion of the at least one main pawl and the internal toothed portion; and
   a second restricting structure disposed between the sub pawl, which does not include the first restricting structure, and the cam for holding the sub pawl in a disengagement state between the external toothed portion of the sub pawl and the internal toothed portion.

2. The vehicle seat reclining device according to claim 1, wherein one end of the spring is engaged with the first arm and the other end is engaged with the cam so that the cam is pushed away from the sub pawl by the force of the spring when extending.

3. The vehicle seat reclining device according to claim 2, wherein the transmitting structure is formed by a first projection formed on the cam and a first cam groove formed on each of the plurality of pawls and engaged with the first projection inserted into the first cam groove.

4. The vehicle seat reclining device according to claim 2, wherein the first restricting structure is formed by a second projection formed on the at least one main pawl and a stepped portion formed on the second arm and engaged with the second projection and wherein the movement of the at least one main pawl in an engagement direction is restricted by the engagement between the second projection and the stepped portion.

5. The vehicle seat reclining device according to claim 4, comprising at least two of said main pawls.

6. The vehicle seat reclining device according to claim 2, wherein the second restriction structure is formed by a third projection formed on the cam and a second cam groove formed on the sub pawl and engaged with the third projection inserted into the second cam groove, and wherein the movement of the sub pawl in the engagement direction is restricted by the engagement between the third projection and the second cam groove.

7. The vehicle seat reclining device according to claim 6, wherein the second restricting structure functions as the transmitting structure as well.

8. The vehicle seat reclining device according to claim 1, wherein the transmitting structure is formed by a first projection formed on the cam and a first cam groove formed on each of the plurality of pawls and engaged with the first projection inserted into the first cam groove.

9. The vehicle seat reclining device according to claim 1, wherein the first restricting structure is formed by a second projection formed on the at least one main pawl and a stepped portion formed on the second arm and engaged with the second projection, and wherein the movement of the at least one main pawl in an engagement direction is restricted by the engagement between the second projection and the stepped portion.

10. The vehicle seat reclining device according to claim 9, comprising at least two of said main pawls.

11. The vehicle seat reclining device according to claim 1, wherein the second restriction structure is formed by a third projection formed on the cam and a second cam groove formed on the sub pawl and engaged with the third projection inserted into the second cam groove, and wherein the movement of the sub pawl in the engagement direction is restricted by the engagement between the third projection and the second cam groove.

12. The vehicle seat reclining device according to claim 11, wherein the second restricting structure functions as the transmitting structure as well.

* * * * *